(12) United States Patent
Weik et al.

(10) Patent No.: US 6,337,902 B1
(45) Date of Patent: Jan. 8, 2002

(54) METHOD FOR PROCURING INSTRUCTIONS REGARDING A TARGET SUBSCRIBER IN A TELECOMMUNICATION NETWORK AND NODAL POINTS FOR THIS

(75) Inventors: Hartmut Weik, Stuttgart; Wolfgang Lautenschlager, Weissach-Flacht, both of (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/207,663

(22) Filed: Dec. 9, 1998

(30) Foreign Application Priority Data

Dec. 10, 1997 (DE) ............................. 197 54 782

(51) Int. Cl.[7] ............................................. H04M 15/00
(52) U.S. Cl. ......................... 379/114.28; 379/127.01; 379/213.01
(58) Field of Search ..................... 379/88.16, 213, 379/229, 230, 207, 201, 114.28, 127.01, 213.01

(56) References Cited

U.S. PATENT DOCUMENTS

| | | | |
|---|---|---|---|
| 4,754,479 A | | 6/1988 | Bicknell et al. |
| 5,315,517 A | | 5/1994 | Inaguma |
| 5,572,583 A | * | 11/1996 | Wheeler, Jr. et al. ... 379/201 X |
| 5,729,598 A | * | 3/1998 | Kay ............................. 379/115 |
| 5,729,599 A | * | 3/1998 | Plomondon et al. ........ 379/211 |
| 5,754,630 A | * | 5/1998 | Srinivasan ............... 379/212 X |
| 5,949,871 A | * | 9/1999 | Kabay et al. ............ 379/207 X |
| 6,088,433 A | * | 7/2000 | Culli et al. .................. 379/114 |

FOREIGN PATENT DOCUMENTS

| | | |
|---|---|---|
| EP | 0 498 593 A2 | 8/1992 |
| EP | 0 753 975 A2 | 1/1997 |
| JP | 5-316233 | 11/1993 |

OTHER PUBLICATIONS

"Automatische, Rechnergesteurete Ansage Geanderter Rufnummern in Konventionellen Vermittlungssystemn", by Dieter Humboldt, F.I.T.C.E. (Jan.–Feb. 1977, vol. 16, No. 1, pp. 1–6.

* cited by examiner

*Primary Examiner*—Creighton Smith
(74) *Attorney, Agent, or Firm*—Sughrue Mion, PLLC

(57) ABSTRACT

A method for procuring instructions regarding a target subscriber in a telecommunication network, who cannot be reached via the subscriber number dialed at a source terminal (TSRC). By dialing the subscriber number at the source terminal, a connection (CON1, CON2) is established from the source terminal via a first nodal point (XSRC)—which can be connected with an intelligent network unit (SCP)—to a second nodal point (XDEST). The second nodal point sends the first nodal point an answer message that the desired subscriber number cannot be reached. The connection on a section (CON2) to the first nodal point is released, and after receiving the answer message, the first nodal point requests instructions from the intelligent network unit regarding the target subscriber unable to be reached via the dialed subscriber number. Using the instructions, the first nodal point supplies a speech announcement to the source terminal or it executes the instructions for charging. Nodal points (XSRC, XDEST) for this method are also disclosed.

6 Claims, 1 Drawing Sheet

FIGURE
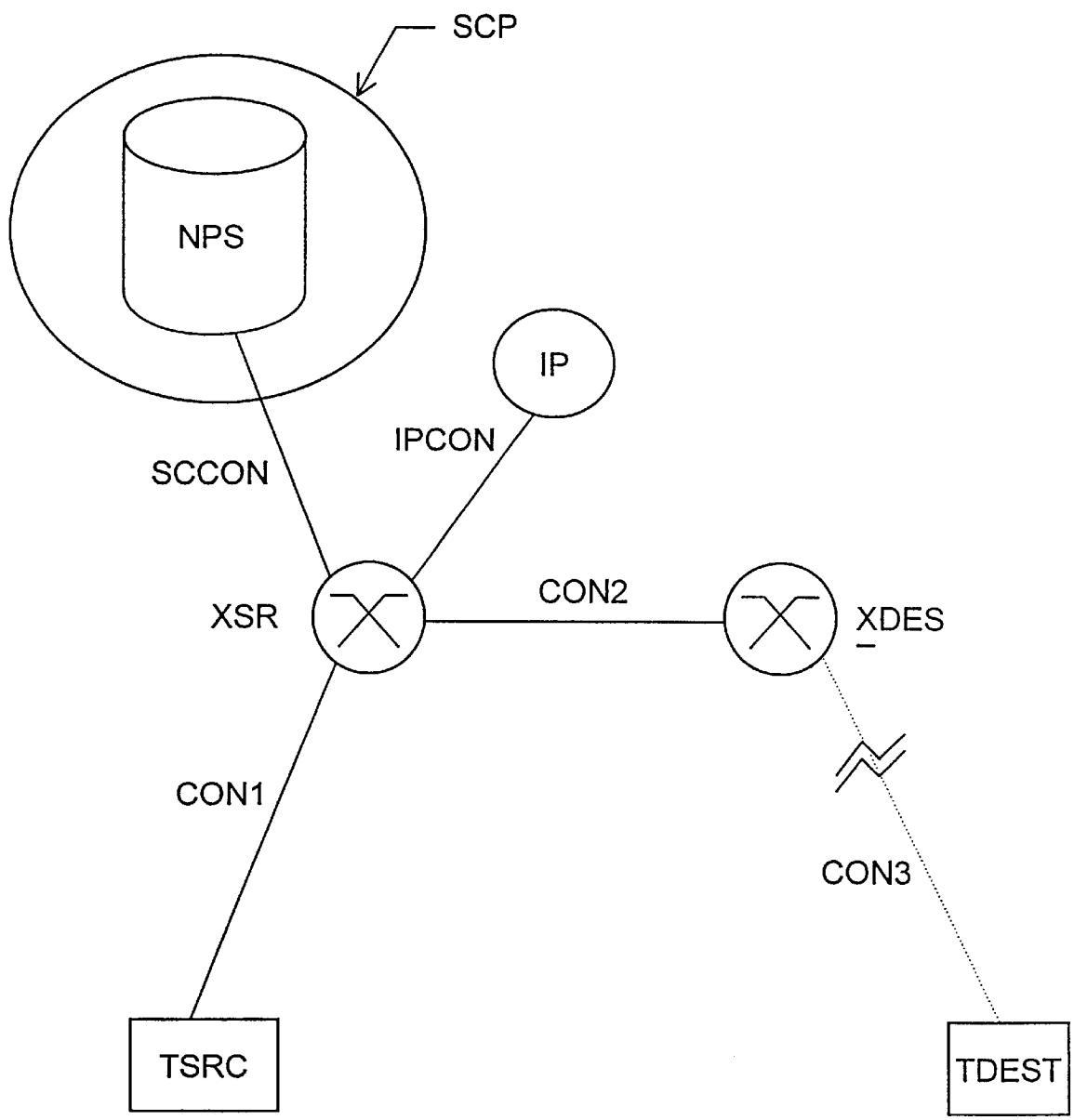

METHOD FOR PROCURING INSTRUCTIONS REGARDING A TARGET SUBSCRIBER IN A TELECOMMUNICATION NETWORK AND NODAL POINTS FOR THIS

BACKGROUND OF THE INVENTION

The present invention relates to a method for procuring instructions regarding a target subscriber in a telecommunication network, as well as source and destination nodal points for this.

Due to a subscriber's moving, in a telecommunication network it is repeatedly necessary for the subscriber to be assigned a new subscriber number because the subscriber can no longer be reached via the old subscriber number of the previous subscriber line of his previous residence, but rather via his new subscriber number at his new residence. The deregulation of the telecommunication market may also have the result that a subscriber who changes his service provider cannot always keep his previous subscriber number. So that a caller who calls the moved subscriber at his previous subscriber number—and whose call is therefore established to a local switching center of the previous residence—does not try several times in vain to call under the old subscriber number, an announcement is switched on from this local switching center that at least informs the caller that the called subscriber cannot be reached at the dialed subscriber number.

When he calls the old subscriber number, the caller is advantageously also informed of the new subscriber number of the called subscriber. As is known from the particle "Automatic, computer-controlled announcement of changed call numbers in conventional switching systems" by Dieter Humboldt, employee in the Darmstadt central telephone office, published in the magazine F.I.T.C.E. (January–Febuary. 1977, volume 16, issue no. 1, pp. 1–6, ISSN: 0304–4416), to announce the new subscriber number the local switching center of the previous residence connects the call to a central announcement center which determines the new subscriber number using the previous subscriber number and announces it by means of an automatic speech generation. The announcement is then transmitted from the central announcement center via the local switching center to the caller. In the simplest case, the subscriber line of the caller and the subscriber number that cannot be reached are in the range of operation of the same local switching center, in such a way that besides the local switching center, only the line paths from the caller to the local switching center and on to the central announcement center are loaded by this call and the announcement of the new subscriber number However, the caller will often call from a farther location and then make use of several nodal points and a longer line path, eventually also in the long-distance service range. The author of the aforementioned article therefore points out that the caller can listen to the announcement of a changed subscriber number in long-distance service only for a limited period of time free of charge.

To handle a call to a subscriber unable to be reached at the dialed subscriber number, components of an intelligent network are used in European patent application EP 0 753 975 A2 instead of the central announcement center. When a caller enters a subscriber number at his terminal, the call is established via a source switching center and to a SSP nodal point (SSP=Service switching Point). The SSP nodal point then checks, by means of a call number list, whether the desired subscriber can be reached at the dialed subscriber number or if he has received a new subscriber number. If the desired subscriber has a new subscriber number, the SSP nodal point asks a SCP nodal point (SCP=Service Control Point) for instructions as to how the call should be handled further. According to these instructions, the SSP nodal point establishes either a connection from the caller on to a terminal with the new subscriber number or, using a so-called intelligent processor—this refers to an intelligent peripheral—plays an announcement for the caller that gives information on the new subscriber number. With this method, the SSP nodal point must determine for each call whether the desired subscriber can be reached via the dialed subscriber number. In addition, an updated call number list of changed subscriber numbers must always be available in the SSP nodal point. Since there are typically numerous SSP nodal points in a telecommunication network, a non-negligible expenditure is incurred in maintaining the call number lists.

As an alternative, the aforementioned European patent application proposes to store the call number list in the SCP nodal point. Then, at each call to be further processed, the SSP nodal point must first send the SCP nodal point an inquiry regarding the dialed subscriber number in order to learn whether or not the subscriber number has changed and how to proceed in the case of a changed subscriber number. For most calls, however, the dialed subscriber number is the current subscriber number of the desired subscriber, in such a way that considerable data traffic is created by the regular inquiries to the SCP nodal point.

SUMMARY OF THE INVENTION

The technical problem of the invention is to easily further process a call to a target subscriber who cannot be reached with a subscriber number dialed at a terminal.

This technical problem is solved by a method for procuring instructions whereby with the method, by dialing the subscriber number at the source terminal (TSRC), a connection (CON1, CON2) is established from this source terminal (TSRC) via a first nodal point (XSRC)—which can be connected with an intelligent network unit (SCP)—to a second nodal point (XDEST), with the following steps: the second nodal point (XDEST) sends the first nodal point (XSRC) an answer message that the desired subscriber number cannot be reached via the second nodal point (XDEST), the connection (CON1, CON2) on the section (CON2) from the second nodal point (XDEST) to the first nodal point (XSRC) is released, after receiving the answer message, the first nodal point (XSRC) requests instructions from the intelligent network installation (SCP) regarding the target subscriber unable to be reached via the dialed subscriber number, the intelligent network installation (SCP) transmits the requested instructions to the first nodal point (XSRC), if the instructions concern a speech announcement, the first nodal point (XSRC), using the instructions, supplies a speech announcement to the source terminal (TSRC), or if the instructions concern charging for a call to a new subscriber number of the target subscriber unable to be reached via the dialed subscriber number, the first nodal point. (XSRC) executes the instructions for charging.

The invention further comprises a nodal point (XDEST) for procuring instructions regarding a target subscriber in a telecommunication network, whereby the nodal point (XDEST) has means for receiving and means for executing an instruction with which the nodal point (XDEST) is instructed to make a connection from a first nodal point (XSRC) through itself and on to a unit with a subscriber number indicated in the instruction, and whereby the nodal point (XDEST) has means to send the first nodal point an answer message if the unit can no longer be reached via the subscriber number for the nodal point because the subscriber number has been replaced by a new subscriber number, characterized in that the nodal point (XDEST) includes means to insert into the answer message a piece of information that the selected subscriber number can no longer be reached because the subscriber number has been replaced by a new subscriber number.

The invention further includes a nodal point for procuring instructions regarding a target subscriber in a telecommunication network who can no longer be reached via a subscriber number dialed at a source terminal (TSRC), whereby the nodal point (XSRC) has means, when dialing the subscriber number at the source terminal (TSRC), to make a connection (CON1, CON2) from this source terminal (TSRC) through itself and on to at least a second nodal point (XDEST), and whereby the nodal point (XSRC) can be connected with an intelligent network unit (SCP), characterized in that the nodal point (XSRC) includes: means to receive and read an answer message that is sent from the second nodal point (XDEST) when the desired subscriber number cannot be reached via the second nodal point (XDEST); means, after reading the answer message, to send the intelligent network unit (SCP) an inquiry with which instructions are requested regarding the target subscriber unable to be reached via the dialed subscriber number, means to receive the requested instructions from the intelligent network unit (SCP), and if the instructions concern a speech announcement, the nodal point (XSRC) has means to supply, according to the instructions, a speech announcement to the source terminal with a content indicated in the instructions, or if the instructions concern charging for a call to a new subscriber number of the target subscriber unable to be reached via the dialed subscriber number, the nodal point (XSRC) has means to execute the instructions for charging Further advantageous designs of the invention can be seen from the dependent claims and the description.

BRIEF DESCRIPTION OF THE DRAWING

In the following, the invention and its advantages are illustrated using an example of execution, with the help of the drawings, wherein the single figure shows an example of an arrangement for execution of the method according to the invention from a first nodal point according to the invention, a second nodal point according to the invention, a terminal and an intelligent network unit.

DETAILED DESCRIPTION OF THE INVENTION

The figure shows an arrangement with which the method according to the invention can be executed. A source terminal TSRC can be connected via a connection section CON1 to a first nodal point XSR, hereinafter referred to as the source switching center XSRC, and further via a connection section CON2 with a second nodal point XDEST, hereinafter referred to as the target switching center XDEST. Both the connection section CON1 and the connection section CON2 are each parts of a telecommunication network—not shown in detail—and can therefore each be subdivided into further connection subsections—not illustrated—and run through further units of the telecommunication network, such as further nodal point or multiplexers and demultiplexers. The telecommunication network not shown can be formed from several partial networks, e.g. from a line-bound network and a mobile radiotelephone network that are connected with each other.

The source switching center XSRC can provide SSP functions (SSP=Service Switching Point) and can therefore establish a SCCON connection to a NPS data base (NPS= Number Portability Server) that contains the old as well as new subscriber numbers of subscribers whose numbers have changed. As mentioned in the beginning, such a subscriber number change can be entered in the NPS database due to a subscriber's move or due to a change to another service provide. But it is also possible that a subscriber number change to another subscriber number is only temporarily entered, e.g., because a subscriber number is transferred to a subscriber line at the vacation location during a vacation trip or to a subscriber line of an alternative subscriber switching center during an outage of a subscriber switching center. The NPS database is part of a SCP nodal point SCP that performs SCP functions (SCP=Service Control Point). According to the invention, the NPS database additionally contains other instructions—described in more detail below—for these subscribers. In addition, the source switching center XSRC can call up service functions via an IPCON connection in an IP intelligent unit (IP=Intelligent Peripheral), such as a speech announcement function or a speech recognition function. The SSP functions and the SCP function may also be provided jointly by a single nodal point, which is then designated a SSCP nodal point (SSCP= Service Switching and Control Point). In this case, the source switching center XSRC and the SCP nodal point SCP would then be a single, combined unit. It is also possible to build the NPS database into the source switching center XSRC, in such a way that the SCCON connection to the SCP nodal point SCP can be dropped.

If a caller then wants to call a target subscriber with the source terminal TSRC and assumes that a target terminal TDEST of the target subscriber can be reached via a subscriber number at the target switching center XDEST, the caller calls this subscriber number—hereinafter referred to as the "old subscriber number" on the source terminal TSRC. After dialing the old subscriber number on the source terminal TSRC, a connection is established via a connection section CON1 to a source switching center XSRC and further via a connection section CON2 to a target switching center XDEST. The target subscriber can no longer be reached via the old subscriber number, however, because he has changed his residence for example and can henceforth be reached via another target switching center not illustrated. The no longer available, unswitched subscriber line between the target switching center XDEST and the target terminal TDEST is therefore indicated by a discontinuous connection section CON3 illustrated in dotted line.

The target switching center XDEST recognizes the condition that the connection section CON3 cannot be established, and sends the source switching center XSRC an answer message regarding this condition. Then, the connection section CON2 is released. To transmit the answer message, a release message from what is known as the "Central Signalling System No. 7" is advantageously used as well, of the kind used to release the connection section CON2. The release message is forwarded on a signalling channel—not shown in the figure—between the target switching center XDEST and the source switching center XSRC. In this release message, the answer message can be entered as the reason for the release. Such a reason would be, for example, "unallocated number", which indicates only that the dialed subscriber number cannot be reached. An answer message may also be defined by itself; it could then read "subscriber number changed", for example, and already indicates that the subscriber number of the target subscriber has changed. After the release, the connection section CON2 is free again for other connections, which can be established between the source switching center XSRC and the target switching center XDEST for subscriber terminals not shown in the figure.

The source switching center XSRC receives and reads the answer message and then sends the SCP nodal point SCP an inquiry in which the dialed old subscriber number of the target subscriber is indicated and in which instructions are requested regarding the old subscriber number. If the inquiry relates to an old subscriber number of a subscriber whose number has changed, the SCP nodal point SCP then determines, in its NPS database with the old subscriber number as search criterion, an entry in which instructions are indicated under this subscriber number. The entry with the instructions is forwarded from the SCP nodal point SCP to the source switching center XSRC. The entry typically contains a new subscriber number of the target subscriber and an instruction to establish the call from the, source terminal TSRC to a subscriber line—not shown in the figure—with the new subscriber number of the target subscriber. According to the invention, however, in addition or also in place of the aforementioned instruction to establish the call, the entry contains an instruction to play a speech announcement to the source terminal TSRC. In the speech announcement, the caller can be informed of how the new subscriber number of the target subscriber reads, for example, in such a way that the new subscriber number can be used for a follow-up call. The speech announcement can also indicate what additional costs the caller can expect if he has himself transferred to the subscriber line with the new subscriber number of the target subscriber.

The speech announcement to the source terminal TSRC can be locally generated by the source switching center XSRC, e.g. by means of a speech processor built into the source switching center XSRC and be played via the connection section CON1 to the source terminal TSRC. But it is also possible that for this purpose, the source switching center XSRC accesses the speech announcement function of the IP intelligent unit. The data required for the speech announcement are then sent according to the speech announcement instructions to the IP intelligent unit, which then generates a speech announcement corresponding to the instructions. This speech announcement is fed via the IPCON connection and the connection section CON1 to the source terminal TSRC. In the speech announcement, the caller can be informed for example that the target subscriber has not received a new subscriber number, or he can be informed of the target subscriber's new number which he can immediately use for a follow-up call instead of the old subscriber number. Depending on the instructions from the NPS database, the source switching center XSRC can then end the call from the source terminal TSRC after the speech announcement or make the call to a subscriber line with the new subscriber number of the target subscriber. The call to the new subscriber number can either be made automatically or only after inquiring with the caller and confirmation of the call wish by the caller.

It is possible, however, that the caller has dialed a subscriber number for which there is no entry in the NPS database, e.g. because the caller has misdialed and the connection section CON2 to was therefore erroneously established to the target switching center XDEST. In this case as well, the target switching center XDEST sends an answer message to the source switching center XSRC, e.g. the aforementioned release message with the reason for the release "unallocated number". The source switching center XSRC then asks the SCP nodal point SCP for instructions regarding the dialed subscriber number and receives from it an announcement that no entry for this subscriber number exists in the NPS database. By means of a built-in speech processor, the source switching center XSRC then automatically generates a speech announcement for the source terminal TSRC, which may say "this number is not in service", for example.

It is also possible, even if there is no entry in the NPS database, that the SCP nodal point SCP sends the source switching center XSRC detailed instructions for the speech announcement instead of the announcement that no entry exists for this subscriber number in the NPS database; in these detailed instructions, the contents of the speech announcement to be made are already indicate. The source switching center XSRC can then use the speech announcement function of the IP intelligent unit and does not need a built-in speech processor.

According to the invention, only the connection section CON1, and possibly also the IPCON connection, is used for the speech announcement, because it is not thee target switching center XDEST that provides for the speech announcement but rather the source switching center XSRC and for this reason, the connection section CON2 can already be released before the speech announcement. Use of the invention proves particularly advantageous when the source switching center XSRC and the target switching center XDEST are far from each other, because then a considerable transmission capacity of the telecommunication network, in particular long transmission paths and numerous nodal points are loaded by the speech announcement via the connection section CON2. Such a configuration is specified in particular when the source switching center XSRC serves at the same time as the local switching center and thus the connection section CON1 is particularly short. But also when the source switching center XSRC has a local switching center—not shown in the figure—connected upstream from it on the connection section CON1, according to the invention only as small a portion as possible of the telecommunication network is utilized by the speech announcement, because neither the connection section CON2 nor the target switching center XDEST is loaded by the speech announcement.

In addition, for every call that it is supposed to maintain, the source switching center XSRC does not have to check in advance, by means of a database inquiry, whether the dialed subscriber number is still current or if it has changed. Thus, every call from the source switching center XSRC can be established without delay due to a database inquiry, and only in a small number of cases will it be necessary that the call to be established must be released from the target switching center XDEST because a subscriber number can no longer be reached and a database inquiry in the NPS database is necessary.

In addition, the central announcement center mentioned in the beginning can be dropped or a speech processor built into the source switching center XSRC can be dispensed with, because the units usually existing in an intelligent network anyway, such as the IP intelligent unit, can be used. according to the invention for the announcement service.

Besides the instructions for a speech announcement, the NPS database can also contain instructions for charging for the call from the source terminal TSRC to the new subscriber number of the target subscriber or also for charging for the speech announcement. These charging instructions can be inquired by the source switching center XSRC from the NPS database of the SCP nodal point SCP. The source switching center XSRC then executes the charging instructions e.g. by generating charge data according to the charging instructions and sending the data to a charge calculating center not shown in the figure. Thus, for example, the costs incurred for the speech announcement can be charged to the subscriber line of the target subscriber, while the charges for a subsequent call to the target subscriber are charged to the subscriber line of the caller.

It is also possible, however, that the NPS database contains only charging instructions and no speech announcement instructions. In this case, for a call to a target subscriber who can no longer be reached at his old subscriber number but rather at a new subscriber number, the source switching center XSRC would request and then implement only the charging instructions, in addition to the new subscriber number. For example, the charge calculation for the call to the new subscriber number could be shared out to the subscriber line of the caller and to the subscriber line of the target subscriber, because the call to the old subscriber number of the target subscriber would have incurred lower charges than the call to the new subscriber number does. As already described, the source switching center XSRC generates charge data and sends them to a charge calculating center not shown in the figure. Furthermore, the source switching center XSRC can also transmit the charge data to the source terminal TSRC, e.g. by generating a speech announcement with the help of the IP intelligent unit and feeding it to the source terminal TSRC.

When the source terminal TSRC and the source switching center XSRC are linked together via an ISDN telecommunication network, the source switching center XSRC can also send the charge data to the source terminal TSRC within the framework of a data signalling, as is offered by the DSS1 protocol for ISDN telecommunication networks. The source switching center XSRC can then display the charge data to the caller on a display device, for example.

What is claimed is:

1. A method for procuring instructions regarding a target subscriber in a telecommunication network who can no longer be reached via a subscriber number dialed at a source terminal, comprising:

dialing the subscriber number at the source terminal, establishing a connection from the source terminal via a first nodal point to a second nodal point, sending from the second nodal point to the first nodal point an answer message that the desired subscriber number cannot be reached via the second nodal point, and releasing the connection on the section from the second nodal point to the first nodal point, sending an instruction request from the first nodal point to an intelligent network installation, after receiving the answer message, regarding the target subscriber, and then receiving at the first nodal point the requested instructions from the intelligent network installation;

wherein, when the instructions concern charging for a call to a new subscriber number of the target subscriber, the first nodal point executes the instructions for charging.

2. A method according to claim 1, characterized in that the answer message is contained in a release message that is sent for releasing the connection on the section from the second nodal point to the first nodal point.

3. A method according to claim 1 or 2, characterized in that the answer message indicates that the dialed subscriber number cannot be reached because the subscriber number has been replaced by a new subscriber number.

4. A method according to claim 1, characterized in that the first nodal point requests the speech announcement from a speech announcement unit and that the speech announcement unit transmits the speech announcement to the first nodal point.

5. A nodal point for procuring instructions regarding a target subscriber in a telecommunication network who can no longer be reached via a subscriber number dialed at a source terminal, comprising:

means for making a connection, when dialing the subscriber number at the source terminal, from the source terminal through itself and to at least a second nodal point, whereby the nodal point is connected with an intelligent network unit;

means for receiving and reading an answer message sent from the second nodal point when the desired subscriber number cannot be reached via the second nodal point;

means for sending an inquiry, in response to reading said answer message, to the intelligent network unit, said inquiry requesting instructions regarding the target subscriber unable to be reached via the dialed subscriber number;

means for receiving the requested insructions from the intelligent network unit; and means for executing said received insructions, including executing instructions concerning charging for a call to a new subscriber number of the target subscriber unable to be reached via the dialed subscriber number.

6. An intelligent network unit for providing instructions regarding a target subscriber in a telecommunication network who can no longer be reached via a subscriber number dialed at a source terminal, comprising:

means for storing instructions concerning charging for a call to a new subscriber number of the target subscriber;

means for receiving an inquiry from a nodal point requesting instructions regarding the target subscriber unable to be reached via the dialed subscriber number;

means for responding to said inquiry from said nodal point by determining said instructions for charging for said call for said new subscriber number; and means for sending to said nodal point said instructions concerning charging for said call to said new subscriber number of the target subscriber unable to be reached via the dialed subscriber number.

* * * * *